Oct. 25, 1927.
J. L. BRENNAN
1,646,638
SNOW REMOVING AND LOADING PLOW
Filed Nov. 1, 1926   2 Sheets-Sheet 2
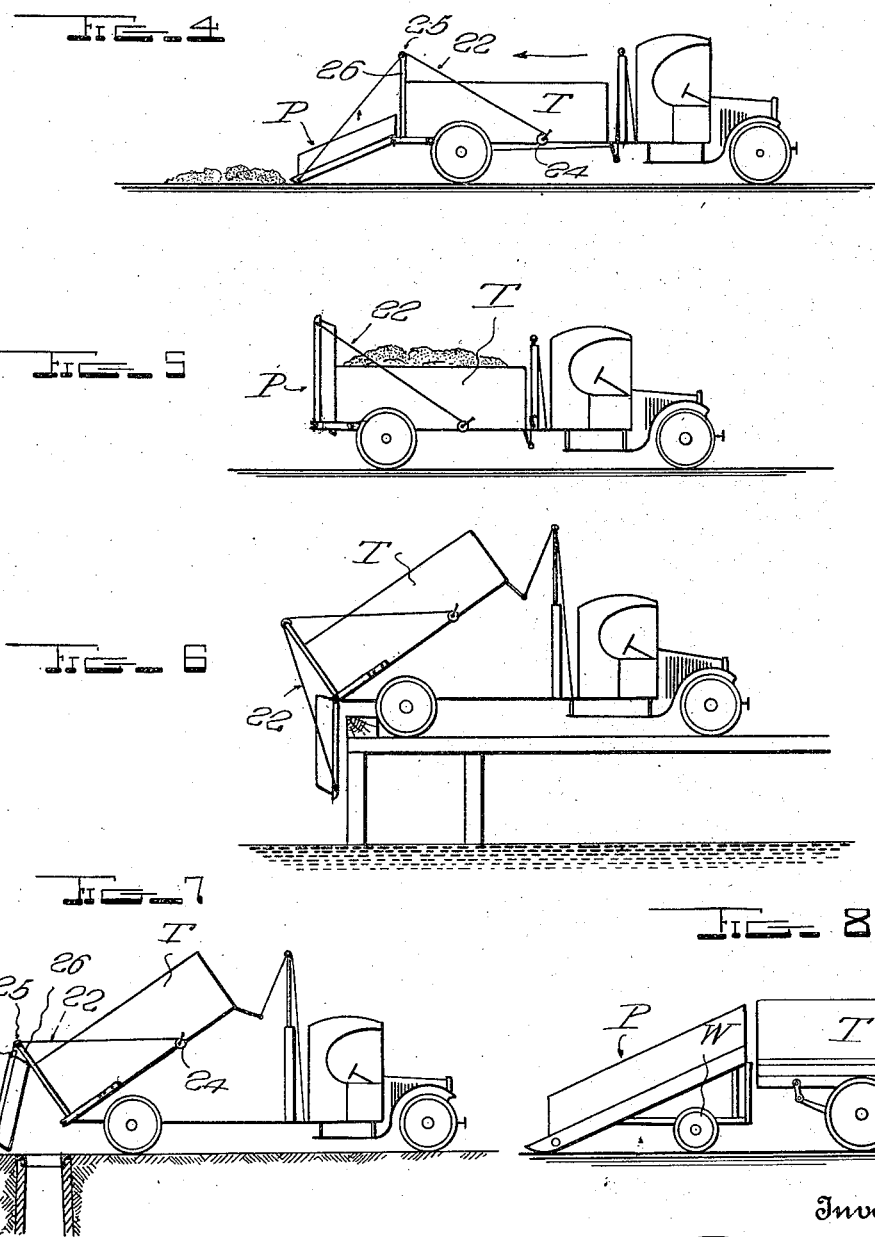
Witness
Inventor
Joseph L. Brennan,
By H. R. Wilson & Co.
Attorneys Patented Oct. 25, 1927.

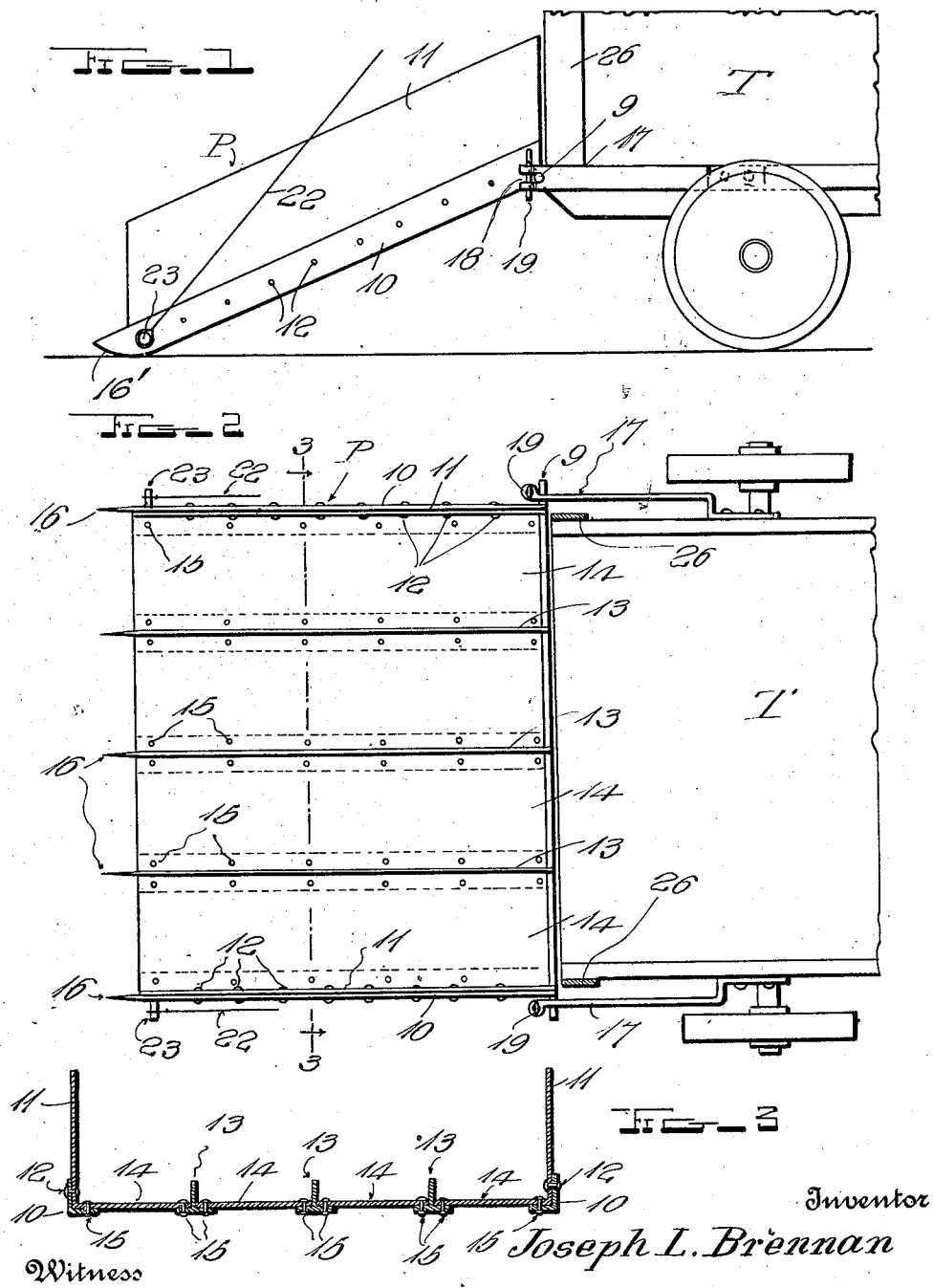

1,646,638

UNITED STATES PATENT OFFICE.

JOSEPH L. BRENNAN, OF NEW YORK, N. Y.

SNOW REMOVING AND LOADING PLOW.

Application filed November 1, 1926. Serial No. 145,560.

This invention aims to provide a new and improved device which may be effectively used at the open rear end of a truck, for the purpose of scooping snow from a street or other surface and directing it into the truck body, when said truck is backed. While I am aware that devices of this nature are not broadly new, it is one of my aims to provide a new and improved construction which may be easily and advantageously manufactured, and will be efficient and durable.

Provision is preferably made for swinging the plow or scoop upwardly when the truck is loaded, so that it then acts as a tail-gate for the truck body, and another aim is to make novel provision whereby either the lower end or the upper end of the plow or scoop may be swung rearwardly from the tail-gate forming position so that the snow may be advantageously dumped in one manner or another, for instance, over the edge of a wharf, or into a man-hole.

With the foregoing in view, the invention resides in the novel subject matter hereinafter described and claimed, the description being supplemented by the accompanying drawings.

Fig. 1 is a side elevation of a plow constructed in accordance with my invention, showing it operatively connected with the rear end of a truck.

Fig. 2 is a top plan view of the parts shown in Fig. 1.

Fig. 3 is a vertical transverse sectional view on the plane of line 3—3 of Fig. 2.

Fig. 4 is a diagrammatic side elevation illustrating the manner of operating the truck and plow to scoop snow from a street or other surface and direct it into the truck body.

Fig. 5 is a diagrammatic side elevation illustrating the manner in which the plow forms a tail-gate for a loaded truck.

Fig. 6 is a view similar to Figs. 4 and 5 but showing one manner in which the truck may be dumped, for instance, over the edge of a wharf.

Fig. 7 is a view similar to Fig. 6, illustrating the manner in which the truck may be dumped into a man-hole.

Fig. 8 is a diagrammatic side view, illustrating the plow as a unit separate from the truck.

In the drawings above briefly described, illustrating the preferred form of construction, P designates the plow as a whole, said plow when in its operative position, being inclined as shown in Figs. 1, 4 and 8. This plow may either be constructed for pivotal connection with a truck T, or may be formed as a separate unit from the truck and provided with suitable supporting wheels W, as seen in Fig. 8. In constructing this plow, I prefer to make use of the details shown most clearly in Figs. 1, 2 and 3.

The numeral 9 designates a transverse member at the upper end of the plow, which member is in the form of a shaft, if said plow is to be attached to the truck. Two laterally spaced angle bars 10, are welded or otherwise secured at one end to the shaft 9, and two upstanding side plates 11 are secured by rivets 12 or other desired means, to the upstanding flanges of said bars 10, the lateral flanges of these bars being inwardly directed as shown in dotted lines in Fig. 2 and in full lines in Fig. 3.

Positioned longitudinally between the bars 10 and welded or otherwise secured at their upper ends, to the shaft 9, are a number of inverted T-bars 13, which bars are spaced from each other and are also spaced from the bars 10.

Elongated, bottom plates 14 rest upon the lateral flanges of the bars 10 and 13 and are rigidly secured thereto by rivets 15 or other desired means. Thus, the angle bars, the T-bars and the plates co-operate in forming a rigid and durable plow or scoop, and the upstanding flanges of said bars, projecting above the plates 14, constitute snow-splitting blades. These blades split the snow as the plow is rearwardly forced by the truck and loading is thus greatly facilitated, and it is insured that the snow can more uniformly fill the truck body.

Preferably, the lower or rear ends of the upstanding flanges of the bars 10 and 13, project beyond the lateral flanges of these bars and are sharpened as indicated at 16 in Fig. 2. The lower edges of these projecting flange portions are beveled as at 16′, providing shoes adapted to effectively travel over uneven portions of streets and the like, when the plow and the truck are being backed.

For hingedly connecting the plow P with the truck T, I have shown arms 17 secured to and projecting rearwardly from said truck, the rear ends of said arms having notches 18 which receive the ends of the shaft 9, said shaft ends being normally held in the notches by removable pins 19. Thus, the scoop or plow may be vertically swung or detached, as occasion may demand. When in its upwardly swung position, the plow or scoop constitutes a tail-gate for the truck, and when this gate is downwardly swung as in Fig. 6 and the truck body inclined, said body may be dumped from a wharf or other elevated support. It is often desirable however to dump the truck into a manhole as disclosed in Fig. 7. Hence, provision is made for permitting the lower end of the plow or scoop P to swing rearwardly from its tail-gate-forming position, when this is to be done.

In the present showing, cables 22 are connected at their rear ends with suitable lugs or the like 23 at the rear ends of the angle bars 10, while the front ends of said cables are wound on appropriate drums 24. These cables pass over sheaves 25 on the upper ends of standards 26 which rise from the rear end of the truck body. When the cables are wound upon the drums, the member P will be upwardly swung from the snow-loading position of Figs. 1 and 4, to the tail-gate-forming position of Fig. 5, and suitable means associated with the drums, will of course hold the cables against unwinding until desired. Then, these cables may be unwound if the truck is to dump as shown in Fig. 6. However, if it is necessary to dump the truck as shown in Fig. 7, the pins 19 are removed from the bars 18. Then, the lower end of the member P may rearwardly swing as depicted in Fig. 7, portions of the cables 22 then forming pivotal supporting means for said member P. The truck may thus be dumped into a man-hole or onto a surface substantially flush with its wheel base.

It will be seen from the foregoing that while the invention is rather simple and inexpensive, it will be efficient, reliable, durable and in every way desirable. Excellent results may be obtained from the general construction disclosed, and it is therefore preferably followed. However, within the scope of the invention as claimed, variations may of course be made.

I claim:

1. A snow removing plow comprising a transverse shaft, a pair of laterally spaced angle bars secured to and projecting from the ends of said shaft, said bars having inwardly projecting lateral flanges and upstanding flanges, a plurality of inverted T-bars spaced apart between said angle bars and secured at one end to said shaft, bottom plates secured to the lateral flanges of said angle and T-bars, and side plates secured to the upstanding flanges of said angle bars, the upstanding flanges of said angle and T-bars forming snow splitting blades.

2. A structure as specified in claim 1; said upstanding flanges projecting longitudinally beyond said lateral flanges at the end of the plow remote from the shaft, the lower edges of said projecting flange portions being beveled, providing shoes to travel upon a surface from which snow is being removed.

3. In combination with a truck; a combined snow loading scoop and tail-gate, means detachably hinging one end of said combined scoop and tail-gate to the truck body, and means connected with the other end of said combined scoop and tail-gate for swinging the same to and holding it in tail-gate forming position, a portion of said means serving as a pivotal support for the upper end of said combined scoop and tail-gate when in tail-gate forming position, permitting rearward swinging of its lower end upon release of said hinging means from the truck body.

4. A structure as specified in claim 3; said swinging means comprising hoisting cables connected to the combined scoop and tail-gate, elevated cable guides carried by the rear end of the truck and engaged by said cables, and winding means for said cables.

5. A snow removing plow comprising a pair of spaced side plates, angle bars having upstanding flanges secured to said side plates and lateral flanges projecting inwardly therefrom, and a bottom secured to said lateral flanges and including an inverted T-bar and plates secured to the lateral flanges thereof, the upstanding flanges of said T-bar and angle bars forming snow splitting blades, said upstanding flanges projecting longitudinally beyond the lateral flanges at one end of the plow and being beveled at their lower edges, providing shoes to travel upon a surface from which snow is being removed.

6. In a snow removing plow, a bottom including an inverted T-bar and plates secured to the lateral flanges thereof, the upstanding flange of said bar forming a snow splitting blade, said upstanding flange also projecting longitudinally beyond said lateral flanges at one end of the plow and having a beveled lower edge, providing a shoe to travel on a surface from which snow is being removed.

7. In a snow removing plow, a pair of spaced side plates and a bottom, said bottom comprising a pair of angle iron bars extending full length of the bottom and side plates and having their upstanding flanges secured to the lower edges of said side plates and having lateral flanges projecting inwardly therefrom, a plurality of inverted T-bars extending the full length of the bottom and spaced apart between said angle iron bars and in parallel relation thereto, the upstanding flanges of said inverted T-bars forming snow splitting blades, and plates extending the full length of the bottom between said T-bars and having their edges secured to the upper sides of the lateral flanges of said T-bars, the up-standing flanges of said angle-bars and said inverted T-bars extending beyond the lateral flanges thereof at their lower or rear ends, said projecting ends being beveled upwardly to provide shoes and having sharpened edges.

In testimony whereof I have hereunto affixed my signature.

JOSEPH L. BRENNAN.